United States Patent
Greuel et al.

(10) Patent No.: US 9,334,442 B2
(45) Date of Patent: May 10, 2016

(54) LUMINESCENT MATERIAL PARTICLES COMPRISING A COATING AND LIGHTING UNIT COMPRISING SUCH LUMINESCENT MATERIAL

(75) Inventors: Georg Greuel, Roetgen (DE); Thomas Juestel, Witten (DE); Jagoda Magdalena Kuc, Steinfurt (DE)

(73) Assignee: Koninklijke Philips N.V., Eindhoven (NL)

( * ) Notice: Subject to any disclaimer, the term of this patent is extended or adjusted under 35 U.S.C. 154(b) by 154 days.

(21) Appl. No.: 14/127,812

(22) PCT Filed: Jun. 25, 2012

(86) PCT No.: PCT/IB2012/053208
§ 371 (c)(1),
(2), (4) Date: Jan. 7, 2014

(87) PCT Pub. No.: WO2013/001444
PCT Pub. Date: Jan. 3, 2013

(65) Prior Publication Data
US 2014/0131619 A1    May 15, 2014

(30) Foreign Application Priority Data
Jun. 29, 2011 (EP) .................................. 11171840

(51) Int. Cl.
*C09K 11/77* (2006.01)
*H01J 61/00* (2006.01)
(Continued)

(52) U.S. Cl.
CPC ........... *C09K 11/025* (2013.01); *C09K 11/7701* (2013.01); *C09K 11/772* (2013.01); *C09K 11/7706* (2013.01); *C09K 11/778* (2013.01); *C09K 11/7709* (2013.01); *C09K 11/7713* (2013.01); *C09K 11/7721* (2013.01); *C09K 11/7738* (2013.01); *C09K 11/7741* (2013.01); *C09K 11/7774* (2013.01); *C09K 11/7777* (2013.01); *H01J 61/44* (2013.01)

(58) Field of Classification Search
CPC ............................... H01J 61/44; C09K 11/025
See application file for complete search history.

(56) References Cited

U.S. PATENT DOCUMENTS

| 5,051,277 A | 9/1991 | Sigai |
| 5,604,396 A * | 2/1997 | Watanabe ............ C09K 11/025 313/485 |
| 7,223,482 B2 * | 5/2007 | Do ........................ C09K 11/025 252/500 |

(Continued)

FOREIGN PATENT DOCUMENTS

| EP | 0638625 B1 | 9/2002 |
| EP | 1483777 B1 | 4/2009 |

(Continued)

OTHER PUBLICATIONS

Kuc, Jagoda et al "Coating of UV-C Phosphor YPO4: Bi3+ with MgO, Al2O3, and MgAl2O4", University of Applied Sciences, 2010.

Primary Examiner — Carol M Koslow

(57) ABSTRACT

The invention provides a a luminescent material comprising particles of UV-luminescent material having a coating, wherein the coating (a "multi-layer coating") comprises a first coating layer and a second coating layer, wherein the first coating layer is between the luminescent material and the second coating layer, and wherein in a specific embodiment the second coating layer comprises an alkaline earth oxide, especially MgO. Further, the invention provides a lighting unit comprising such luminescent material.

13 Claims, 2 Drawing Sheets

(51) Int. Cl.
    *C09K 11/02*    (2006.01)
    *H01J 61/44*    (2006.01)

(56) References Cited

U.S. PATENT DOCUMENTS

| | | | |
|---|---|---|---|
| 7,527,695 B2 * | 5/2009 | Ikuta | H01L 21/67028 134/1 |
| 2001/0033133 A1 | 10/2001 | Justel | |
| 2008/0203891 A1 | 8/2008 | Gaertner | |
| 2008/0252193 A1 | 10/2008 | Yamada | |
| 2009/0096958 A1 | 4/2009 | Matsuura | |
| 2011/0304264 A1 | 12/2011 | Winkler | |

FOREIGN PATENT DOCUMENTS

| | | |
|---|---|---|
| WO | 2006006129 A2 | 1/2006 |
| WO | 2006072893 A1 | 7/2006 |
| WO | 2006109238 A2 | 10/2006 |

* cited by examiner

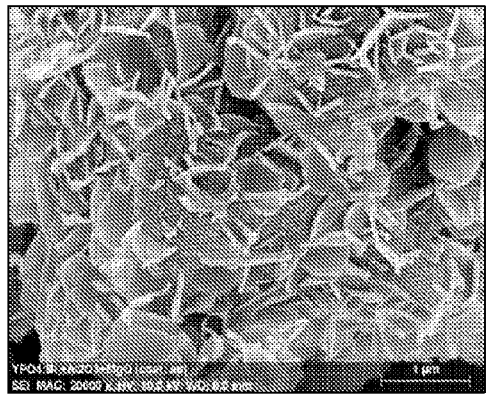 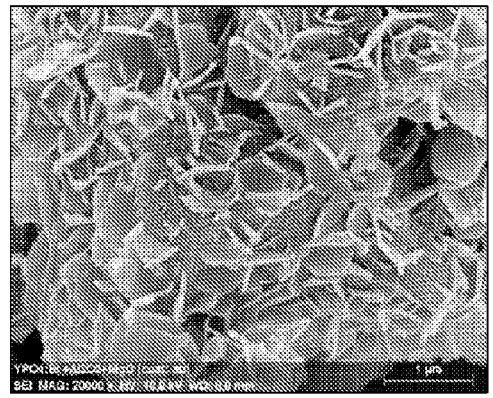
FIG. 2A          FIG. 2B
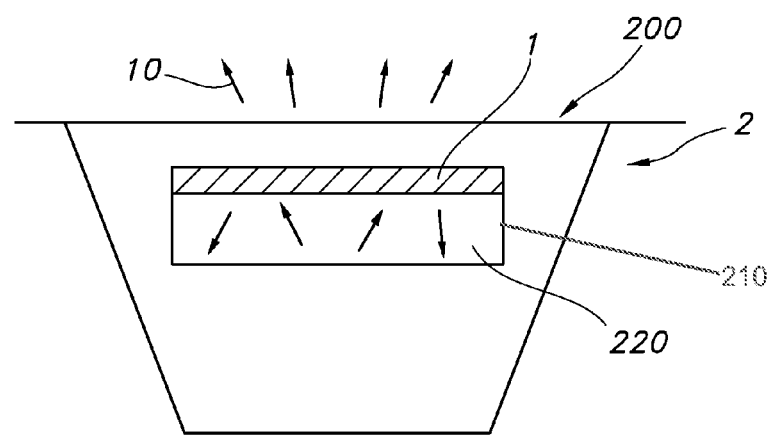
FIG. 3

LUMINESCENT MATERIAL PARTICLES COMPRISING A COATING AND LIGHTING UNIT COMPRISING SUCH LUMINESCENT MATERIAL

CROSS-REFERENCE TO PRIOR APPLICATIONS

This application is the U.S. National Phase application under 35 U.S.C. §371 of International Application No. PCT/IB2012/053208, filed on Jun. 25, 2012, which claims the benefit of European Patent Application No. 11171840.9, filed on Jun. 29, 2011. These applications are hereby incorporated by reference herein.

FIELD OF THE INVENTION

The invention relates to a luminescent material particles comprising a coating and lighting unit comprising such luminescent material

BACKGROUND OF THE INVENTION

Dielectric barrier discharge lamps with protective coatings are known in the art. WO2006072893, for instance, describes a system incorporating a DBD lamp, a dielectric barrier discharge (DBD-) lamp, and a phosphor coating for use as luminescent coating in a dielectric barrier discharge (DBD-) lamp, especially in a mercury-free DBD-lamp, comprising several phosphor grains together forming a luminescent coating layer for converting a primary discharge radiation into a wanted radiation, whereby the phosphor coating comprises a protective coating layer at least partly surrounding the luminescent coating layer for minimizing degradation of the luminescent coating layer during use in a DBD-lamp.

Further, also coatings on luminescent material particles are known in the art. U.S. Pat. No. 5,051,277 for instance describes a method of making a bi-layer coating on phosphor particles. The first layer surrounding the phosphor is silica. The second layer surrounding the phosphor is alumina. The bi-layer phosphor is considered to be useful in fluorescent lamps providing improved maintenance and brightness. The bi-layer phosphor can also be used in high color rendition lamps employing blends of phosphors.

SUMMARY OF THE INVENTION

UV radiation sources have found many application areas, such as spectroscopy, cosmetic skin treatment, medical skin treatment, disinfection or purification of water and air, polymer hardening, photochemistry, surface curing, wafer processing, and so on. Many of the above mentioned application fields require deep UV radiation, i.e. UV- or even VUV radiation, whereby fast switching cycles and invariance against temperature fluctuations are desired features.

Widely applied radiation sources are low or medium pressure Hg discharge lamps, while the former lamp has an emission spectrum, which is dominated by two lines, viz. at 185 and 254 nm. Upon increasing the Hg vapor pressure the Hg lines broaden, which finally results in an almost continuous spectrum extended from the deep UV to the deep red spectral range. However, the application of Hg implies a rather strong dependence on temperature and sensitivity towards fast switching cycles.

Since the 1990ties, the application of dielectric barrier (DB) noble gas excimer discharge is regarded as an alternative discharge concept for the development of UV emitting radiation sources. The Xe excimer discharge, e.g. emits mainly 172 nm radiation and DB driven quartz lamps comprising Xe as a filling gas show a wall plug efficiency of more than 30%. A quartz lamp based on a Xe excimer discharge was developed by Ushio and Heraeus and is used for the cleaning of wafer surfaces due to the sufficiently high energy of the emitted 172 nm (VUV) photons to cleave any type of organic bonds. Other emission wavelengths were achieved by using a XeBr* (282 nm), XeCl (308 nm), or KrCl* (222 nm) excimers, however, this goes at the cost of discharge efficiency.

A range of phosphors for the conversion of the 172 nm radiation as emitted by the Xe excimer discharge into visible light (white lamps or plasma displays) or into UV-A, UV-B, or UV-C radiation have been subject to patent applications in the past.

A fluorescent Xe excimer discharge lamps using one or several VUV to UV-C down converting phosphors is of particular interest for disinfection or purification of for instance water. Presently applied UV emitting materials for these Xe, Ne, or Xe/Ne excimer lamps still have some drawbacks, such as too low conversion efficiency, a too low photochemical stability, a too low chemical stability, and/or a too low spectral overlap with the germicidal action curve.

Even though a series of novel materials and improvement measures have been invented, a considerable need for novel and improved materials as VUV to UV radiation converters for Xe excimer discharge lamps exists.

Hence, it is an aspect of the invention to provide an alternative luminescent material and/or an alternative lighting unit with such luminescent material, which preferably further at least partly obviate one or more of above-described drawbacks. It is further an aspect of the invention to provide an alternative lighting unit, for instance comprising a dielectric barrier discharge as light source, and such alternative luminescent material, which preferably further at least partly obviate one or more of above-described drawbacks.

Surprisingly, it was found that a multi-layer coating, also herein indicated as "onion-shell type coating", on the particles of luminscent materials, such as $YPO_4$:Bi, may have advantageous effects, such with respect to stability and may especially show a peculiar coating morphology, which very much deviates from the coating morphology of a single layer particle coating, e.g. made out of $Al_2O_3$ or MgO. A coating layer of $Al_2O_3$ or MgO onto a UV phosphor, e.g. $YPO_4$:Bi, shows a granular (layer) structure.

In contrast to that, a double layer coated particulate luminscent material, such as $YPO_4$:Bi sample, wherein the first layer is $Al_2O_3$ and the second layer is MgO, shows a coating morphology characterised by the second (outer) coating layer that exhibits a flake-like structure ("extended structures"). Such a structure was found independent of the applied amount of MgO.

Hence, in a first aspect, the invention provides a luminescent material comprising particles of UV-luminescent material having a coating, wherein the coating (a "multi-layer coating") comprises a first coating layer and a second coating layer, wherein the first coating layer is (arranged) between the luminescent material and the second coating layer, and wherein in a specific embodiment the second coating layer comprises an alkaline earth oxide, especially MgO.

Highly alkaline (earth) inorganic oxides, such as MgO, $La_2O_3$, or $MgAl_2O_4$, have a large ion induced secondary electron emission coefficient and can thus reduce the ignition voltage of a noble gas discharge in contact to such a material. Hence, such materials as second coating layer material may be beneficial.

Such coating may enhance the lifetime, since the first dense coating layer may act as a diffusion barrier, while the second coating layer may improve the resistance of the phosphor particles towards the discharge. This will yield less staining and less reduction of the photoluminescence quantum yield during lamp operation.

It may be of especially benefit to apply these double layer coatings to UV emitting luminescent materials, since these phosphors show particularly strong degradation in discharge lamps due to the build-up of an absorbing layer at the phosphor plasma interface causing re-absorption.

As will be clear to the person skilled in the art, the first coating layer and the second coating layer are UV transmissive. This implies that coatings may be chosen in such a way, as to allow UV light transmit through the coating. The transmissivity of the coating can be tuned, as known to the person skilled in the art, by varying for instance coating material(s) and coating thickness. In the invention, the coating thickness of the multi-layer coating will in general be in the range of 2-800 nm, such as 20-600 nm and of the individual layers in the range of 1-200 nm, like at least 10 nm, for the first coating layer and 1-600 nm, like at least 20 nm, for the second coating layer.

The term multi-layer coating herein indicates that at least two coating layers are present, with at least a first coating layer, as described herein, and at least a second coating layer, as described herein. The second coating layer is preferably an outer coating layer, although in an embodiment the second coating layer may be provided with one or more further coating layers. Likewise, between the luminescent material and the first coating layer and/or between the first coating layer and the second coating layer, one or more coating layer may be present. However, in a specific embodiment, the (multi-layer) coating only comprises the first coating layer and the second coating layer as describe herein. Hence, the coating of the invention is a multi-layer coating, comprising at least the first coating layer and the second coating layer.

Herein, the terms "luminescent material", "particles of UV-luminescent material having a coating" and "UV-luminescent material" are applied. The term "luminescent material" refers to the material as a whole. This includes the coated particles, for instance as a particulate layer on a screen or window of a light source. The term "particles of UV-luminescent material having a coating", as it can be derived from the term itself, refers to the particles, which contain UV-luminescent material particles coated with the coating of at least the first and the second coating layer (surrounding the UV-luminescent material, which is in the core of the particles). The term "UV-luminescent material" refers to the core of the particles which contains the UV-luminescent material.

In an embodiment, the second coating layer comprises one or more of $(Mg,Ca)O$, $(Ca,Sr)_3Al_2O_6$, $(Mg,Ca,Sr)Al_2O_4$, $(Ca,Sr)_4Al_{14}O_{25}$, $(Ca,Sr)Al_4O_7$, $(Ca,Sr)Al_{12}O_{19}$, $LaMgAl_{11}O_{19}$, $(Ba,Sr)MgAl_{10}O_{17}$, and $(Ba,Sr)Mg_3Al_{14}O_{25}$. These are all alkaline earth oxides. Especially, the alkaline earth oxide (of the second coating layer) may comprise $(Mg_xCa_{1-x})O$, with x=0.0-1.0. Herein, terms like "(Mg,Ca)" and similar terms indicate that at the cation sites in the luminescent material Mg or Ca may be present. However, it also includes embodiments wherein at one or more of such cation sites Mg is present and wherein at one or more of such cation sites Ca is present. It also includes embodiments wherein the cation sites only comprise one of the indicated species, i.e. either Mg (i.e. MgO) or Ca (i.e. CaO). As indicated above, the alkaline earth oxides are especially preferred because of their large ion induced secondary electron emission coefficient.

Further, these are stable materials, with often a (very) good UV transmissivity. This may especially apply to $(Mg_xCa_{1-x})O$, even more specially MgO. Hence, in a specific embodiment, the alkaline earth oxide comprises MgO.

Further, it appears (see also above) with inorganic oxides like the alkaline earth oxides, especially $(Mg_xCa_{1-x})O$ as second coating layer, that the second coating layer may have extending structures. Such structures may be beneficial for the discharge. Hence, especially for dielectric barrier discharge, the luminescent material of the invention may be applied. The structures may have dimensions like length, width, and thickness in the order of about 0.1-1.0 μm.

The first coating is preferably also an inorganic oxide, preferably an oxide of the group of aluminum, one or more of the lanthanides (especially one or more of Y, La and Lu), silicon, zirconium, and one or more of the alkaline earth elements. The chemical composition of the first coating layer is different from the second coating layer.

The first coating layer, as indicated above, is especially useful as diffusion barrier, i.e. to prevent the access of discharge components, e.g. Xe, Ne, or any other noble gas, to the surface of the luminescent material. Herein, the term "inorganic oxide" may in an embodiment also refer to a combination of oxides and/or in an embodiment refer to a mixed oxide. Especially, the first coating layer comprises one or more materials selected from the group consisting of $Al_2O_3$ (α, γ, θ, δ-phase), $Ln_2O_3$ (Ln=La, Y, Lu, or a combination thereof), $LnPO_4$ (Ln=La, Y, Lu, or a combination thereof), $SiO_2$, $Al_2SiO_5$, $Mg_2SiO_4$, (Ca,Sr,Ba)-polyphosphate, $(Mg,Ca)_2P_2O_7$, or $ZrO_2$. Especially those type of materials may be suitable as UV transmissive and protective coating material in the first coating layer. In a specific embodiment, the first coating layer comprises $Al_2O_3$. (especially having one of the morphologies as indicated above. The term $Al_2O_3$ (α, γ, θ, δ-phase) may refer to an alumina having one of these morphologies (structures), but may in an embodiment also refer to a mixture of aluminas having different morphologies (structures).

The UV-luminescent material may be any material, but may especially comprise a luminescent material excitable by UV light of a dielectric barrier noble gas excimer discharge. The term "luminescent material" and similar terms may in an embodiment also refer to a plurality of different luminescent materials. For instance, a mixture of different (particulate) luminescent materials may be applied. However, alternatively or additionally, the luminescent material particles may also comprise particles containing plurality of different luminescent materials. Luminescent materials may be different in the sense that the chemical compositions are different. Even if the chemical compositions are substantially identical, but only the activator content (substantially) differs, for instance 1 or 2 mol-% of $Bi^{3+}$ or 1 or 2 mole-% of $Ce^{3+}$, such luminescent materials may be considered different. Especially, the UV-luminescent material comprises one or more luminescent materials selected from the group consisting of $K(Y_{1-x}Lu_x)_3F_{10}$:A (A=Ce, Pr, Nd, Gd, Bi), $(Y_{1-w-x-y}La_xLu_y)F_3$:A (A=Ce, Pr, Nd, Gd), $(Y_{1-x-y}La_xLu_y)PO_4$:A (A=Ce, Pr, Nd, Gd, Bi), $(Y_{1-x-y}La_xLu_y)BO_3$:A (A=Ce, Pr, Nd, Gd, Bi), $(Ca_{1-x}Sr_x)Li_2SiO_4$:PrNa, $(Ca_{1-x}Sr_x)Li_2SiO_4$:CeNa, $(Y_{1-x-y}Lu_xLa_y)AlO_3$:A (A=Pr, Gd), $LaMgAl_{11}O_{19}$:A (A=Ce, Pr, Nd, Gd, Bi), $(Ba,Sr)_2SiO_4$:Pr,Na, $(Ca_{1-x}Sr_x)Al_{12}O_{19}$:PrNa, $(Ca_{1-x}Sr_x)_4Al_{24}O_{25}$:PrNa, $(Y_{1-x-y}La_xLu_y)_2SiO_5$:A (A=Ce, Pr, Gd, Nd, Bi), $(Y_{1-x-y}La_xL_y)_2Si_2O_7$:A (A=Ce, Pr, Nd, Gd, Bi), $(Y_{1-x}Lu_x)_3Al_{5-a}Ga_aO_{12}$:A (A=Pr, Gd, Bi), $(Ba_{1-x}Sr_x)MgAl_{10}O_{17}$:CeNa, $Sr_2MgSi_2O_7$:Pb, $Sr_2MgSi_2O_7$:PrNa, $BaSi_2O_5$:Pb, $LaB_3O_6$:A (A=Pr, Gd, Bi), $SrAl_{12}O_{19}$:CeNa, $GdMgB_5O_{10}$:A (A=Ce, Pr), $CaF_2$:CeNa, $LaCl_3$:A (A=Ce, Pr, Gd), $SrCl_2$:

CeNa, or $SrB_4O_7$:Eu. Here, x, y are (independently) in the ranges of 0.0-1.0, and when both x and y are present in a chemical formula, further $x+y \leq 1$ applies.

Herein, dopant or activator terms like "Ce, Pr, Nd, Gd, Bi" and similar terms, as for instance used above, may in an embodiment refer to the application of one of such activator in the indicated host material, but may in another embodiment also refer to the application of a plurality of such activators. For instance, $(Y_{1-x-y}La_xLu_y)_2SiO_5$:A (A=Ce, Pr, Gd, Nd, Bi) may in an embodiment refer to $(Y_{1-x-y}La_xLu_y)_2SiO_5$:Ce, such as $Y_2SiO_5$:Ce, but may in another embodiment refer to $(Y_{1-x-y}La_xLu_y)_2SiO_5$:Ce, Pr, such as $Y_2SiO_5$:Ce, Pr or for instance $Lu_2SiO_5$:Ce, Pr.

Especially, the UV-luminescent material comprises $YPO_4$: $Bi^{3+}$. Even more especially, such luminescent material comprises particles of such UV-luminescent material having a first coating of $Al_2O_3$ and a second coating of MgO.

In a further aspect, the invention provides a lighting unit comprising a light source configured to generate UV light and the luminescent material as defined herein. The luminescent material is configured to absorb at least part of the UV light and configured to convert at least part of the UV light in luminescence light, especially UV light of a longer wavelength. Herein, the phrase a light source configured to generate UV light may in an embodiment also refer to a light source configured to generate VUV light. Hence, the indication above that the coatings are transmissive for UV light may thus in an embodiment also include that the coatings are transmissive for VUV light.

VUV radiation is considered to be in the range of 10-200 nm, such as 100-200 nm. UV-C radiation is in the range of 200-280 nm, UV-B radiation in the range of 280-315 nm and UV-A radiation is in the range of 315-400 nm. Hence, herein, UV radiation may refer to light having a wavelength selected from the range of 10-400 nm As will be clear to a person skilled in the art, the conversion of the (UV) light source light by the luminescent material will in general be to a longer (UV) wavelength, for instance conversion of VUV radiation into UV-B.

Especially, the lighting unit (which may also be indicated as radiation unit) comprises a dielectric barrier noble gas excimer discharge lamp as light source. Above, the advantages of the coating are indicated. Not only the stability of the luminescent material may be improved, even the discharge may be improved. For instance, the invention may be applied as luminescent screen comprising one or several luminescent materials as described herein. In an embodiment, a Hg or noble gas discharge lamp comprising a discharge vessel, which is coated by luminescent material as defined herein, is provided.

In a further aspect, the invention provides the use of such radiation unit (or lighting unit) according as defined herein, for one or more of photochemical, medical, disinfection or purification purposes. Hence, the invention provides in an embodiment the application of a fluorescent lamp, comprising such luminscent material, in any type of equipment or reactor for photochemical, medical, disinfection or purification purposes. Other purposes may however also be included.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 2a-2b show SEM pictures of an example of such luminescent material; and

FIG. 3 schematically depicts an embodiment of an application of the luminescent material in a lighting unit.

The drawings are not necessarily on scale

DETAILED DESCRIPTION OF THE EMBODIMENTS

Figure 1A:
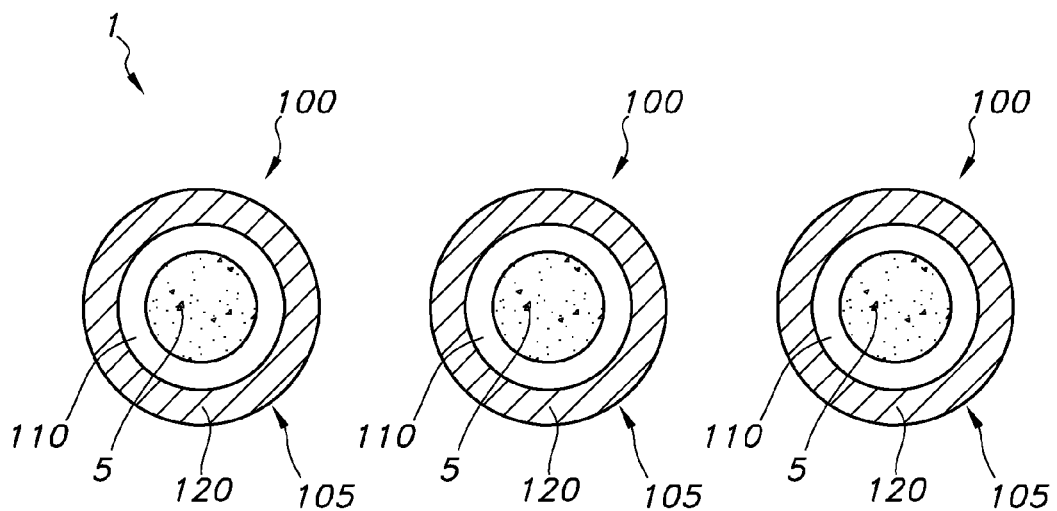
FIGS. 1a-1b schematically depict some aspect of the particles of UV-luminescent material.
Figure 1B:
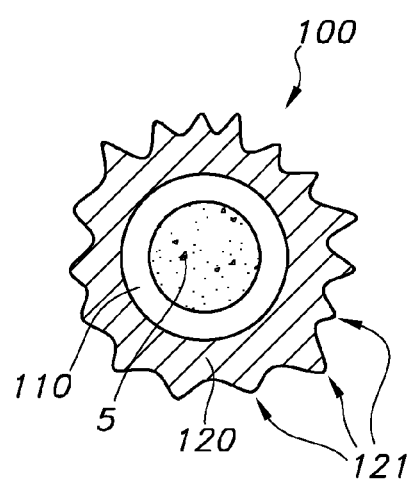

FIG. 1a schematically depicts luminescent material 1, which, by way of example is symbolized by three particles 100. The particles 100 of the luminescent material comprises a core of UV-luminescent material, indicated with reference 5, and at least a first coating layer 110 and a second coating layer 120, with the latter being more remote from the UV luminescent material 5 than the former. In this schematic embodiment, the first coating layer 120 is applied to the core of UV luminescent material 5, and the second coating 120 is applied to the first coating layer 110. The (multi-layer) coating, here a bi-layer coating, is indicated with reference 105. Because of the multi-layer aspect of the coating 105, the coating is herein also indicated as "onion-shell type coating".

As indicated above, especially advantageous is that coating layers 120, like MgO coatings, on the first coating layer 110, may appear to have extending structures, indicated with reference 121. Such structures may facilitate the discharge, assuming the particles are used in a discharge environment, for instance a dielectric barrier discharge lamp (see also below).

FIGS. 2a and 2b show SEM figures of particles of one of the luminescent materials as prepared according to the accompanying example. The extending structures have flake shapes, and have lengths and widths of about 0.1-0.5 μm, and thicknesses in the range of 0.05-0.1 μm.

FIG. 3 very schematically depicts a radiation unit or lighting unit 2, which comprises a light source 200 and the luminescent material 1. Here, the light source 200 is a light source that generates UV light, indicated with reference 210 (light source light), which may be absorbed (at least partially) by the luminescent material 1. On its turn, the (UV) luminescent material 1 may convert at least part of the absorbed light into luminescent material light 10. For instance, the light source 200 may be a dielectric barrier discharge lamp. The luminescent material 1 may be applied as layer in the discharge vessel. The discharge vessel is indicated with reference 220. Examples of YPO$_4$:Bi$^{3+}$ (1%) coated by Al$_2$O$_3$ and MgO Aluminum(III) nitrate nonahydrate (Al(NO$_3$)$_3$.9H$_2$O;), malonic acid (C$_3$H$_4$O$_4$), ammonium chloride (NH$_4$Cl) and urea ((NH$_2$)$_2$CO) were dissolved in H$_2$O. The pH value was adjusted to about 3.5 using diluted NH$_4$OH.

YPO$_4$:Bi$^{3+}$ was added to the above solution. The suspension was heated. The reaction was stopped after reaching a pH-value of about 6.5. In order to reach specified pH (pH=7), diluted ammonia was added drop wise. Subsequently, suspension was stirred for another 30 min to complete precipitation process. The coated material was isolated by filtering and dried in vacuum during at least 12 hours.

Received powder was put into the crucibles and placed into the furnace for the calcination. YPO$_4$:Bi$^{3+}$ coated by Al$_2$O$_3$ is subjected to MgO-coating procedure. Magnesium nitrate hexahydrate (Mg(NO$_3$)$_2$.6H$_2$O) and urea ((NH$_2$)$_2$CO) were dissolved in H$_2$O. YPO$_4$: Bi$^{3+}$ was added to the above solution. The suspension was heated at 90° C. for 3 h. In order to reach desired pH (pH=9,5), diluted ammonia was added drop wise. Subsequently, suspension was stirred for another 30 min to complete precipitation process. The onion-shell coated material was isolated by filtering and dried at 65° C. in vacuum during at least 12 hours. The received powder was placed into the furnace for the final calcinations step.

SEM picture are shown in FIG. 2a/2b.

Systems were made with 2 wt.-% Al$_2$O$_3$ and 1 wt. % or 0.5 wt.-% MgO.

The invention claimed is:

1. A luminescent material comprising:
a plurality of particles of an UV-luminescent material, the UV-luminescent material having a core of the UV-luminescent material, and a coating,
wherein the coating comprises a first coating layer and a second coating layer,
wherein the first coating layer is between the core and the second coating layer,
wherein the second coating layer comprises one or more alkaline earth oxides selected from the group consisting of: (Mg,Ca)O, (Ca,Sr)$_3$Al$_2$O$_6$, (Mg,Ca,Sr)Al$_2$O$_4$, (Ca,Sr)$_4$Al$_{14}$O$_{25}$, (Ca,Sr)Al$_4$O$_7$, (Ca,Sr)Al$_{12}$O$_{19}$, LaMgAl$_{11}$O$_{19}$, (Ba,Sr)MgAl$_{10}$O$_{17}$, and (Ba,Sr)Mg$_3$Al$_{14}$O$_{25}$, and
wherein the second coating layer has extending structures.

2. The luminescent material according to claim 1, wherein the second coating layer comprises an alkaline earth oxide having the formula:

(Mg$_x$Ca$_{1-x}$)O, wherein x=0.0-1.0.

3. The luminescent material according to claim 1, wherein the second coating layer comprises MgO.

4. The luminescent material according to claim 1, wherein the first coating layer comprises one or more materials selected from the group consisting of: Al$_2$O$_3$ (α, γ, θ, δ-phase), Ln$_2$O$_3$ (Ln=La, Y, Lu, or a combination thereof), LnPO$_4$ (Ln=La, Y, Lu, or a combination thereof), SiO$_2$, Al$_2$SiO$_5$, Mg$_2$SiO$_4$, (Ca,Sr,Ba)-polyphosphate, (Mg,Ca)$_2$P$_2$O$_7$, and ZrO$_2$.

5. The luminescent material according to claim 1, wherein the first coating layer comprises Al$_2$O$_3$.

6. The luminescent material according to claim 1, wherein the UV-luminescent material comprises a luminescent material excitable by UV light of a dielectric barrier noble gas excimer discharge.

7. The luminescent material according to claim 1, wherein the UV-luminescent material comprises one or more luminescent materials selected from the group consisting of:
K(Y$_{1-x}$Lu$_x$)$_3$F$_{10}$:A (A=Ce, Pr, Nd, Gd, Bi, or a combination thereof),
(Y$_{1-x-y}$La$_x$Lu$_y$)F$_3$:A (A=Ce, Pr, Nd, Gd, or a combination thereof),
(Y$_{1-x-y}$La$_x$Lu$_y$)PO$_4$:A (A=Ce, Pr, Nd, Gd, Bi, or a combination thereof),
(Y$_{1-x-y}$La$_x$Lu$_y$)BO$_3$:A (A=Ce, Pr, Nd, Gd, Bi, or a combination thereof),
(Ca$_{1-x}$Sr$_x$)Li$_2$SiO$_4$:PrNa,
(Ca$_{1-x}$Sr$_x$)Li$_2$SiO$_4$:CeNa,
(Y$_{1-x-y}$Lu$_x$La$_y$)AlO$_3$:A (A=Pr, Gd, or a combination thereof),
LaMgAl$_{11}$O$_{19}$:A (A=Ce, Pr, Nd, Gd, Bi, or a combination thereof),
(Ba,Sr)$_2$SiO$_4$:Pr,Na,
(Ca$_{1-x}$Sr$_x$)Al$_{12}$O$_{19}$:PrNa,
(Ca$_{1-x}$Sr$_x$)$_4$Al$_{24}$O$_{25}$:PrNa,
(Y$_{1-x-y}$La$_x$Lu$_y$)$_2$SiO$_5$:A (A=Ce, Pr, Gd, Nd, Bi, or a combination thereof),
(Y$_{1-x-y}$La$_x$L$_y$)$_2$Si$_2$O$_7$:A (A=Ce, Pr, Nd, Gd, Bi, or a combination thereof),
(Y$_{1-x}$Lu$_x$)$_3$Al$_{5-a}$Ga$_a$O$_{12}$:A (A=Pr, Gd, Bi, or a combination thereof),
(Ba$_{1-x}$Sr$_x$)MgAl$_{10}$O$_{17}$:CeNa,
Sr$_2$MgSi$_2$O$_7$:Pb,
Sr$_2$MgSi$_2$O$_7$:PrNa,
BaSi$_2$O$_5$:Pb,
LaB$_3$O$_6$:A (A=Pr, Gd, Bi, or a combination thereof),
SrAl$_{12}$O$_{19}$:CeNa, GdMgB$_5$O$_{10}$:A (A=Ce, Pr, or a combination thereof),
CaF$_2$:CeNa, LaCl$_3$:A (A=Ce, Pr, Gd, or a combination thereof),
SrCl$_2$:CeNa, and
SrB$_4$O$_7$:Eu,
wherein x, y and A are each independently selected, and x=0.0-1.0, y=0.0-1.0, and x+y≤1.

8. The luminescent material according to claim 1, wherein the UV-luminescent material comprises YPO$_4$:Bi$^{3+}$.

9. The luminescent material according to claim 1, having a coating thickness of the multi-layer coating in the range of 2-800 nm.

10. A lighting unit comprising a light source configured to generate UV light and the luminescent material according to claim 1.

11. The lighting unit according to claim 10, wherein the lighting unit comprises a dielectric barrier noble gas excimer discharge lamp as light source.

12. The luminescent material according to claim 3, wherein the second coating layer exhibits a flake-like structure.

13. The luminescent material according to claim 1, wherein the first coating layer comprises one or more materials selected from the group consisting of Al$_2$O$_3$ (α, γ, θ, δ-phase), Ln$_2$O$_3$ (Ln=La, Y, Lu, or a combination thereof), LnPO$_4$ (Ln=La, Y, Lu, or a combination thereof), SiO$_2$, $Al_2SiO_5$, $Mg_2SiO_4$, (Ca,Sr,Ba)-polyphosphate, $(Mg,Ca)_2P_2O_7$, or $ZrO_2$, and wherein the alkaline earth oxide comprise $(Mg_xCa_{1-x})O$, with x=0.0-1.0.

* * * * *